Dec. 28, 1926. Re. 16,510

C. F. HUMPHREYS

SURFACE COVERING AND METHOD OF DECORATING THE SAME

Original Filed June 3, 1924 2 Sheets-Sheet 1

Inventor
C. F. Humphreys
Edward S. Rogers and
By Allen W. Reed
Attorneys

Dec. 28, 1926. Re. 16,510

C. F. HUMPHREYS

SURFACE COVERING AND METHOD OF DECORATING THE SAME

Original Filed June 3, 1924 2 Sheets-Sheet 2

Inventor
C. F. Humphreys
Edward S. Rogers and
By Allen M. Reed
Attorneys

Reissued Dec. 28, 1926.

Re. 16,510

UNITED STATES PATENT OFFICE.

CHARLES F. HUMPHREYS, OF LANCASTER, PENNSYLVANIA, ASSIGNOR TO ARMSTRONG CORK COMPANY, A CORPORATION OF PENNSYLVANIA.

SURFACE COVERING AND METHOD OF DECORATING THE SAME.

Original No. 1,520,130, dated December 23, 1924. Serial No. 717,658, filed June 3, 1924. Reissue No. 16,250, dated January 12, 1926, Serial No. 73,930, filed December 7, 1925. This application for reissue filed November 15, 1926. Serial No. 148,592.

The invention relates to coverings for surfaces, and has as an object the provision of a covering for a floor or wall which shall simulate variegated tiles.

A further object of the invention is the provision of a linoleum or wall paper having its surface decoration formed of units arranged according to a uniform pattern, the units varying in appearance among themselves and made up of a limited number of like appearances, the surfaces of similar appearances being placed with a studied non-uniformity.

A further object of the invention is the provision of a floor or wall covering having its surface decorated with spaces arranged according to a definite pattern and comprising a limited number of varying appearances, the individual spaces of like appearance being arranged with studied non-uniformity and the actual occurrence thereof being repeated over surfaces so large as to be not encompassed by a glance of the eye.

Other objects of this embodiment are shown in the accompanying drawings, wherein.

Figure 1:
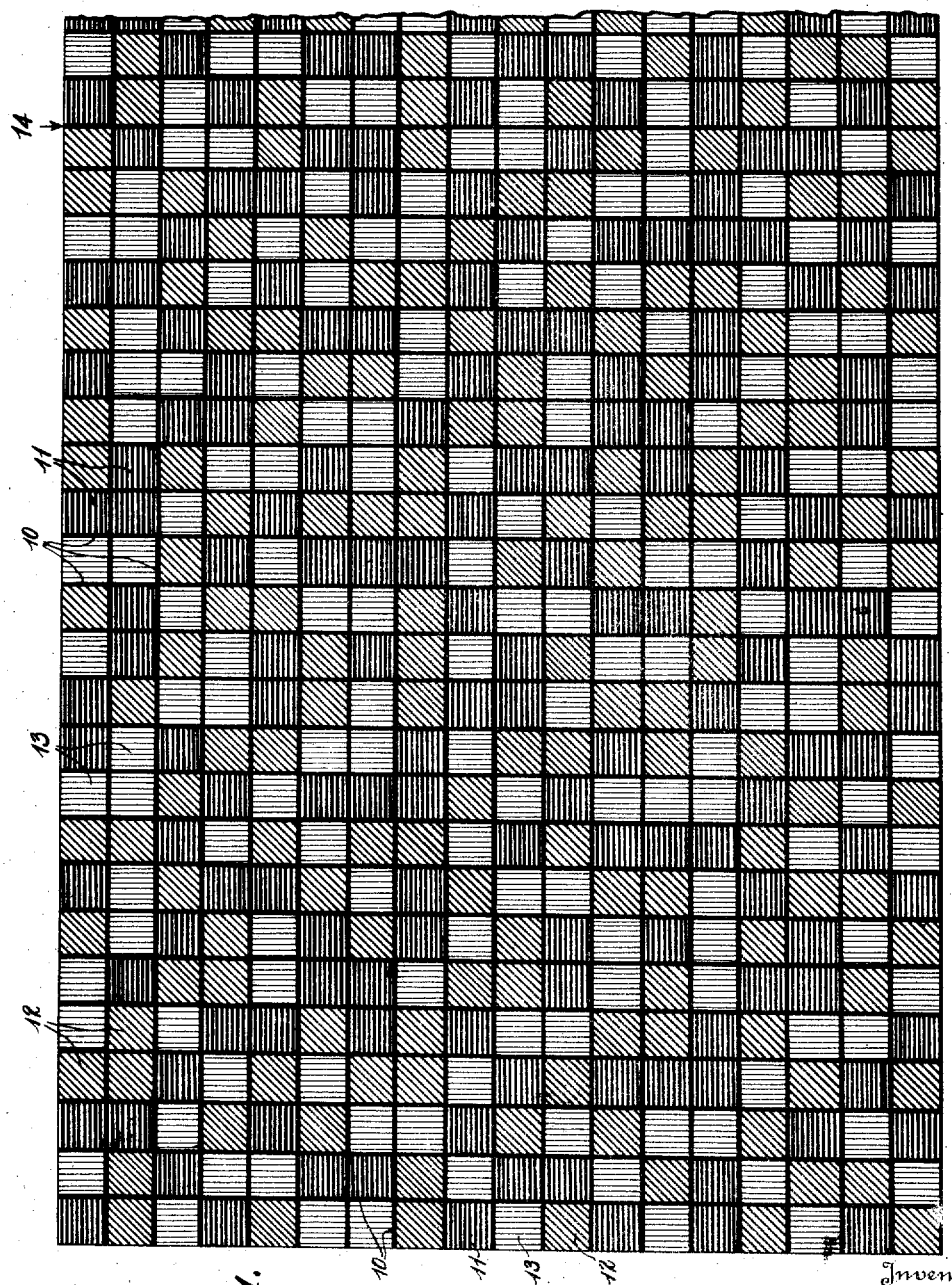
Figure 1 is a plan view of the covering made up of square surfaces.

As shown, Figure 1 represents a strip of linoleum or oil cloth or wall covering made up of a series of squares separated by joints 10.

The squares shown in the figure comprise three varieties of appearances, that of 11 represented by horizontal lines, that of 12 represented by diagonal lines, and that of 13 represented by vertical lines.

As shown, the squares of appearance 11, 12 and 13 are arranged with studied non-uniformity so as to present a haphazard appearance. It is the intention that there shall be not only no pattern of any uniformity but that the actual arrangement which occurs shall not be repeated within a space which the eye can grasp at a single glance.

The minimum size of such repeat areas or spaces varies with the size, arrangement and color of the tile-like units. In general, the smaller the individual tile-like units, the smaller the areas over which the arrangement is repeated, and the larger the units and the more striking their appearance, the larger the areas necessary, in order that the repeat be not readily apparent to the eye.

It will be understood that the statement of the space that can be encompassed by the eye of an observer is illustrative merely, and that the size of this space will obviously vary with individuals as modified by condition of vision, and will also be affected by the distance and angle from which the surface is viewed.

It is found that the space which can be appreciated by the eye of an observer is substantially the length of four feet, and since linoleum is usually made in widths of six feet, the arrangement that could extend the width of the linoleum will be safely beyond any possibility of observance of repetition by the eye of an observer, when laid contiguous to a like strip.

While it has been found that if there is no uniformity over a space of, say, four feet, and throughout a width of linoleum of six feet, the eye will not detect the repetition even with tile-like units of considerable size, nevertheless, the area of the pattern which is repeated may be considerably smaller, particularly if the tile-like units be small and are of shades of the same general color, without the repeat being apparent to the eye of the average observer.

In the manufacture of linoleum or of wall paper, an arrangement has been studied out which shall extend to at least the distance of four feet, as for instance, to the point 14 on Figure 1 of the drawing after which the actual arrangement of the surfaces may be repeated. It is thus possible to produce by machinery a strip of material of indefinite length with a repetition of arrangement and secure a covering which may be placed upon a floor or wall and which will surely give the appearance of having been placed at haphazard.

Figure 2:
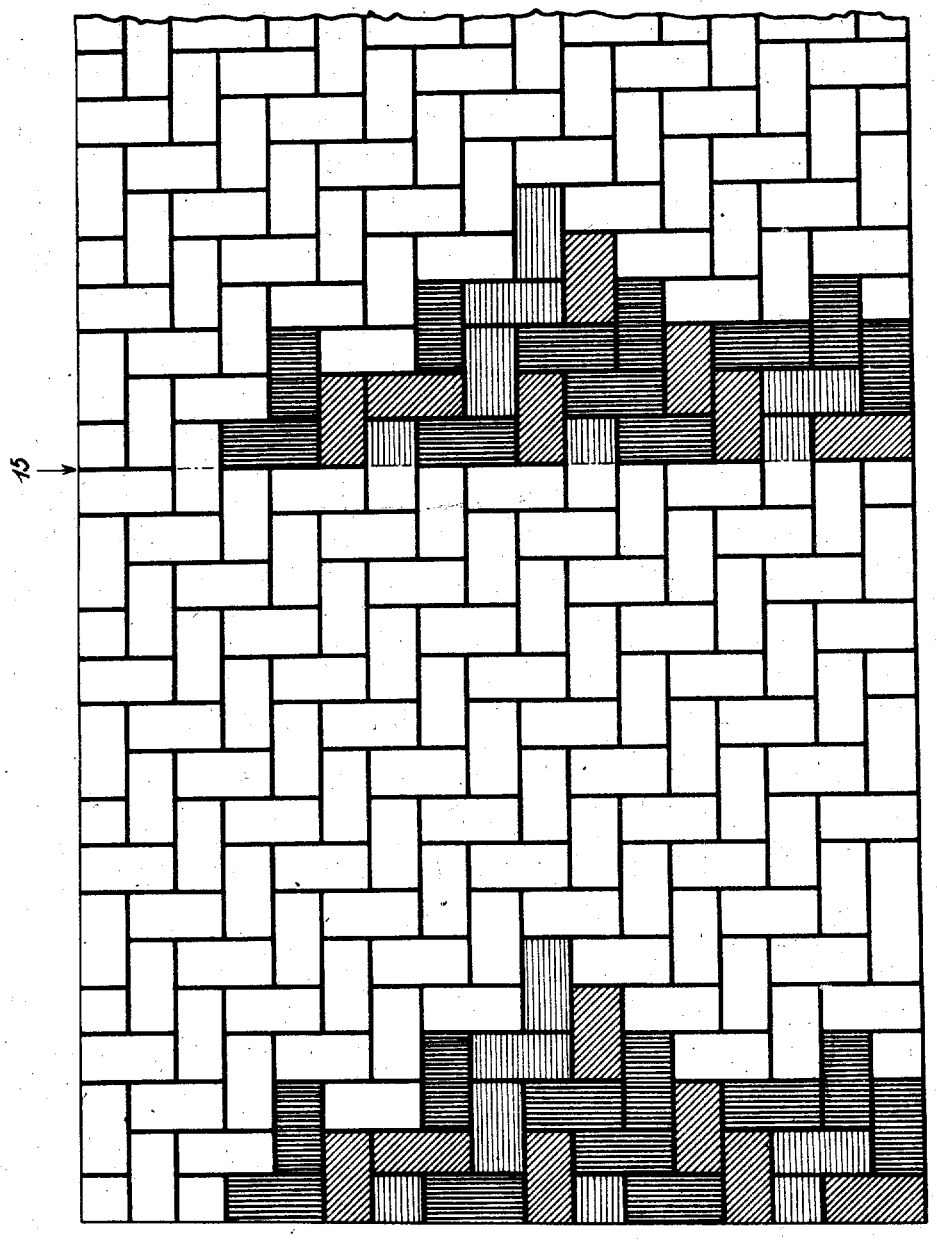
Figure 2 is a like view of a covering made up of rectangular surfaces twice as long as wide.

The principle of Figure 1 is shown in Figure 2 as applied to a design of different shaped surfaces, but is applied in the same manner.

In Figure 2 the repetition of the arrangement will be found to begin at 15 and to the right of this line the arrangement which has already been used to the left thereof is repeated.

By the provision of a linoleum or wall paper of the characteristics provided by the present invention, it is possible to use these coverings in circumstances where the former artificial or set appearance has been objectionable. By means of this invention a surface covering of tiles made up of a like color, but differing among themselves in shades as results from the ordinary practice of burning tile, may be simulated.

The tile may not only be of different shades of the same color but may be tints of different colors which, of course, should harmonize with each other. Therefore, the expression "varying colors", as used in the claims, is meant to include different colors and different shades of the same color. The patterns shown in the drawings are made up of a plurality of spaces of like shape. It will however be understood that a combination of squares and oblongs, for instance, or of other units may be used in lieu thereof, and also that certain of the units may be slightly irregular in shape or placing to better simulate the effect of hand-laid tile.

Using three shades of a color varying from light to dark, the appearance of the covering may be varied by the proportionate choice of different shades, generally darker appearance resulting from a choice of a majority of the darkest shades, or vice versa.

While it has been indicated that the arrangement is to be repeated over a space of not less than four feet, it will be understood that the drawing is not intended to illustrate a full width of linoleum with the length of arrangement referred to.

I claim:

1. The method of decorating a surface which comprises covering the surface of a uniform pattern of spaces with a limited number of varying appearances, arranging the spaces of like appearance upon the surface with irregularity of occurrence, and repeating the arrangement over an area so large as to be not perceived by a single glance of the eye, whereby to simulate the haphazard appearance of hand-laid tiling.

2. A surface covering comprising in combination, a series of spaces arranged in a uniform pattern, the spaces comprising a limited number of varying appearances, the spaces of like appearance upon the surface arranged with irregularity of occurrence and with the arrangement thereof repeated over successive areas so large as to be not perceived by a single glance of the eye whereby the covering when in place may simulate the haphazard appearance of hand-laid tiling.

3. The method of decorating linoleum or similar hard surfaced floor covering, which comprises forming its wearing surface with a uniform pattern of spaces of like shape and a limited number of varying appearances, arranging the spaces of like appearance with irregularity of occurrence, and repeating the arrangement over an area so large as to be not perceived by a single glance of the eye, whereby to simulate the haphazard appearance of hand-laid tiling.

4. Linoleum or similar hard surfaced floor covering, comprising in combination, a series of spaces of like shape arranged in a uniform pattern, the spaces comprising a limited number of varying appearances, the spaces of like appearance arranged with irregularity of occurrence and with the arrangement thereof repeated over successive areas so large as to be not perceived by a single glance of the eye, thereby simulating the haphazard appearance of hand-laid tiling.

5. Linoleum or similar hard surfaced floor covering, comprising a series of tile-like spaces, having a limited number of varying colors arranged in a pattern with irregularity of occurrence so as to simulate the haphazard appearance of hand-laid tiling.

6. Linoleum or similar hard surfaced floor covering, comprising a series of tile-like spaces, having a limited number of varying colors arranged in a pattern with irregularity of occurrence so as to simulate the haphazard appearance of hand-laid tiling, said arrangement being repeated over successive areas of sufficient size so that the repeat is not readily apparent to the eye.

CHARLES F. HUMPHREYS.